(12) United States Patent
Grover

(10) Patent No.: US 11,456,993 B2
(45) Date of Patent: Sep. 27, 2022

(54) CONTENT-MODIFICATION SYSTEM WITH HOUSEHOLD COORDINATION FEATURE

(71) Applicant: Roku, Inc., San Jose, CA (US)

(72) Inventor: Matthew Grover, Cardiff (GB)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/356,485

(22) Filed: Jun. 23, 2021

(65) Prior Publication Data
US 2022/0263790 A1  Aug. 18, 2022

Related U.S. Application Data

(60) Provisional application No. 63/149,532, filed on Feb. 15, 2021.

(51) Int. Cl.
*H04L 61/5046* (2022.01)
*H04L 61/5007* (2022.01)
*H04L 67/62* (2022.01)

(52) U.S. Cl.
CPC ...... *H04L 61/5046* (2022.05); *H04L 61/5007* (2022.05); *H04L 67/62* (2022.05)

(58) Field of Classification Search
CPC ............. H04L 61/2046; H04L 61/2007; H04L 67/325; H04L 45/563; H04L 47/10; H04L 47/11; H04L 47/127
See application file for complete search history.

(56) References Cited

U.S. PATENT DOCUMENTS

| | | | |
|---|---|---|---|
| 8,387,145 B2 * | 2/2013 | Xie | H04L 63/101 726/24 |
| 8,432,808 B1 * | 4/2013 | Dankberg | H04B 7/18517 370/235 |
| 2010/0011090 A1 * | 1/2010 | Gordon | H04L 67/325 709/218 |
| 2017/0311249 A1 * | 10/2017 | Lopes | H04W 36/30 |
| 2020/0014486 A1 * | 1/2020 | Harrang | H04L 65/80 |
| 2021/0036958 A1 * | 2/2021 | Kurita | H04L 47/283 |

* cited by examiner

*Primary Examiner* — Joseph L Greene
(74) *Attorney, Agent, or Firm* — McDonnell Boehnen Hulbert & Berghoff LLP

(57) ABSTRACT

In one aspect, an example method includes receiving, from a first content-presentation device, a request for supplemental content for use in connection with performing a content-modification operation; identifying a download conflict between the first content-presentation device and a second content-presentation device having a same IP address as the first content-presentation device; and providing, to the first content-presentation device, a response to the request, with the request including a download delay instruction. Reception of the download delay instruction by the first content-presentation device causes the first content-presentation device to wait until a condition associated with the download delay instruction is satisfied before downloading a supplemental content item specified in the response.

19 Claims, 14 Drawing Sheets

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| T9 | Compare first fingerprint data and second fingerprint data | | | | |
|---|---|---|---|---|---|
| T10 | Detect a match between first fingerprint data and second fingerprint data | | | | |
| T11 | Identify the channel on which the second content is being received | | | | |
| T12 | Generate metadata associated with the identified channel | | | | |
| T13 | Transmit an indication of the identified channel and the associated metadata | | | | |
| T14 | | | | | Receive the indication of the identified channel and the associated metadata |

Figure 4B

|  |  |  |  |  |  |  |  |
|---|---|---|---|---|---|---|---|
| T15 |  |  |  |  | Determine historical content consumption data |  |  |
| T16 | Transmit third content |  |  |  |  |  |  |
| T17 | Generate third fingerprint data and third metadata |  |  |  |  |  |  |
| T18 | Transmit third fingerprint data and third metadata |  |  |  |  |  |  |
| T19 |  |  |  | Receive modifiable content segment |  |  |  |
| T20 |  |  |  | Generate fourth fingerprint data and fourth metadata |  |  |  |
| T21 |  |  |  | Transmit fourth fingerprint data and fourth metadata |  |  |  |
| T22 |  |  |  |  |  | Receive third fingerprint data and third metadata |  |
| T23 |  |  |  |  |  | Receive fourth fingerprint data and fourth metadata |  |

Figure 4C

| | | | | | | |
|---|---|---|---|---|---|---|
| T24 | Compare at least a portion of third fingerprint data and at least a portion of fourth fingerprint data | | | | | |
| T25 | Detect a match between at least a portion of third fingerprint data and at least a portion of fourth fingerprint data | | | | | |
| T26 | Identify an upcoming content modification opportunity on the identified channel | | | | | |
| T27 | Transmit the third fingerprint data and the third metadata | | | | | |
| T28 | | Receive third fingerprint data and third metadata | | | | |
| T29 | | Receive fifth content | | | | |
| T30 | | Output for presentation fifth content | | | | |

Figure 4D

| | | | | | | | |
|---|---|---|---|---|---|---|---|
| T31 | Generate fifth fingerprint data and fifth metadata | | | | | | |
| T32 | Compare the third fingerprint data and the fifth fingerprint data | | | | | | |
| T33 | Detect a match between the third fingerprint data and the fifth fingerprint data | | | | | | |
| T34 | Determine modification start time and modification end time | | | | | | |
| T35 | Transmit a request for supplemental content | | | | | | |
| T36 | | Receive request and select supplemental content | | | | | |
| T37 | | Transmit request for link | | | | | |
| T38 | | | | | | | Transmit link |

Figure 4E

| T39 | | | | | |
|---|---|---|---|---|---|
| T40 | Receive link and retrieve supplemental content | | Transmit link | | |
| T41 | Perform content modification operation | | | | |

Figure 4F

CONTENT-MODIFICATION SYSTEM WITH HOUSEHOLD COORDINATION FEATURE

CROSS-REFERENCE TO RELATED APPLICATIONS

This disclosure claims priority to U.S. Provisional Patent App. No. 63/149,532, filed on Feb. 15, 2021, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

BACKGROUND

In coming years, the replacement of advertisements in media content with targeted advertisements is expected to become an increasingly important advertising method. By way of example, in a dynamic advertisement insertion (DAI) system, a content provider can insert generic advertisements into advertisement-breaks that interrupt sequences of media content, such as live or pre-recorded content. Each advertisement-break can include a set of advertisement segments arranged in a predetermined order. Further, a particular one of the advertisement segments can be designated or dynamically selected to be replaced with supplemental content, such as a replacement advertisement segment.

With this arrangement, prior to displaying the particular advertisement segment, a content-presentation device can obtain the replacement content, and then provide the replacement content for display instead of the particular advertisement segment. For instance, responsive to determining that the content-presentation device is playing or about to play content that immediately precedes the particular advertisement segment to be replaced, the content-presentation device can retrieve a targeted advertisement segment from a database, and then provide the targeted advertisement segment for display in place of the particular advertisement at the appropriate time.

SUMMARY

In one aspect, a method includes (i) receiving, by a computing system and from a first content-presentation device, a request for supplemental content for use in connection with performing a content-modification operation; (ii) identifying, by the computing system, a download conflict between the first content-presentation device and a second content-presentation device having a same internet protocol (IP) address as the first content-presentation device; and (iii) providing, by the computing system to the first content-presentation device, a response to the request. Based on the identifying, the request includes a download delay instruction, and reception of the response by the first-content presentation device causes the first content-presentation device to wait until a condition associated with the download delay instruction is satisfied before downloading a supplemental content item specified in the response.

In another aspect, a non-transitory computer-readable storage medium has stored thereon program instructions that, upon execution by a processor, cause performance of a set of operations. The set of operations includes (i) receiving, from a first content-presentation device, a request for supplemental content for use in connection with performing a content-modification operation; (ii) identifying a download conflict between the first content-presentation device and a second content-presentation device having a same internet protocol (IP) address as the first content-presentation device; and (iii) providing, to the first convent-presentation device, a response to the request. Based on the identifying, the request includes a download delay instruction, and reception of the response by the first-content presentation device causes the first content-presentation device to wait until a condition associated with the download delay instruction is satisfied before downloading a supplemental content item specified in the response.

In another aspect, a computing system includes a processor and a non-transitory computer-readable storage medium, having stored thereon program instructions that, upon execution by the processor, cause performance of a set of operations. The set of operations includes (i) receiving, from a first content-presentation device, a request for supplemental content for use in connection with performing a content-modification operation; (ii) identifying a download conflict between the first content-presentation device and a second content-presentation device having a same internet protocol (IP) address as the first content-presentation device; and (iii) providing, to the first convent-presentation device, a response to the request. Based on the identifying, the request includes a download delay instruction, and reception of the response by the first-content presentation device causes the first content-presentation device to wait until a condition associated with the download delay instruction is satisfied before downloading a supplemental content item specified in the response.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
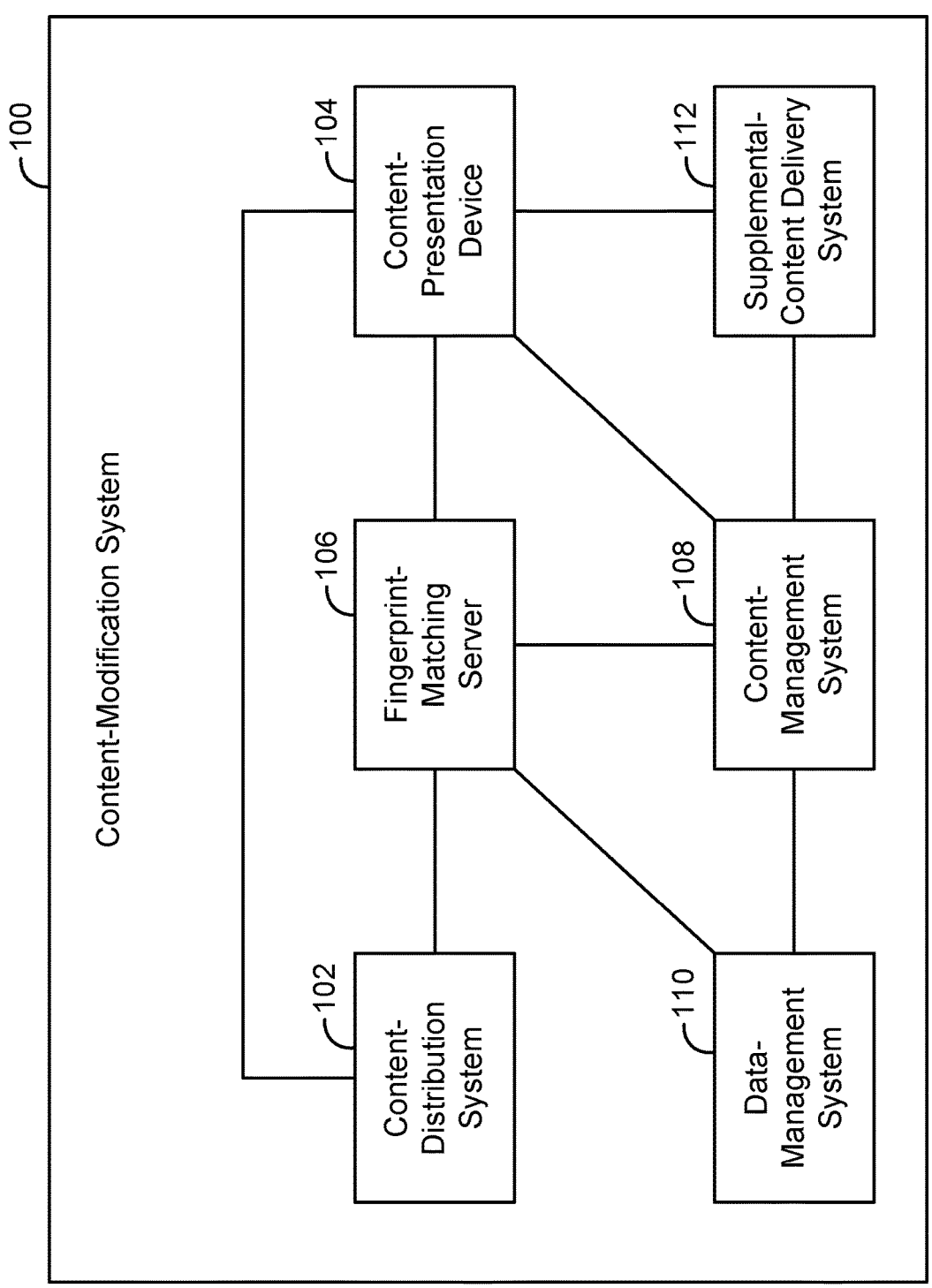
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). The given advertisement segment is referred to as a modifiable advertisement segment. As another example, it can be desirable for the content-presentation device to overlay on the modifiable advertisement segment, overlay content that enhances the modifiable advertisement segment in a way that is again perhaps more targeted to the end-user. The described content-modification system can facilitate providing these and other related features.

In one example, the content-modification system can include a fingerprint-matching server that can identify an upcoming content-modification opportunity on an identified channel, which it can do by comparing and detecting a match between two different instances of fingerprint data. Based on the detected match, the fingerprint-matching server can then transmit fingerprint data and metadata to the content-presentation device data to facilitate preparing the content-presentation device to perform a content-modification operation in connection with the identified upcoming content-modification opportunity.

However, in other cases, it may be desirable for the content-presentation device to use one or more alternative techniques to facilitate performing a content-modification operation.

For example, the fingerprint-matching server can use broadcast-schedule data to facilitate the content-presentation device performing a content-modification operation. Among other things, this can allow the content-presentation device to facilitate performing a content-modification operation without using fingerprint data or by using fingerprint data in a more limited fashion. This can be beneficial in the case where the content-presentation device does not receive or otherwise have access to fingerprint data, or where the use of fingerprint data is undesirable for one or more reasons (e.g., because fingerprint-based techniques may be computationally expensive).

Prior to a content-modification opportunity, a content-presentation device downloads supplemental content for use in carrying out a content-modification operation. In some content-modification systems, if a content-presentation device does not download such supplemental content in its entirety prior to the content-modification opportunity, the content-presentation device is unable to carry out the content-modification operation.

Further, in households with multiple content-presentation devices, the multiple content-presentation devices can share an internet connection via which supplemental content is downloaded. If multiple content-presentation devices are downloading supplemental content at the same time using a shared internet connection, such simultaneous downloading can lead to a situation in which one or more of the multiple content-presentation devices fail to finish downloading supplemental content before a content-modification opportunity because the one or more content-presentation devices had to share available bandwidth with other content-presentation devices.

For instance, if two content-presentation devices within a household are simultaneously downloading supplemental content, both of the content-presentation devices might only be able to download half of the supplemental content before upcoming content-modification opportunities on the respective content-presentation devices, leading to two missed opportunities to carry out a content-modification operation. Whereas, in the same scenario, if just one of the two content-presentation devices was downloading supplemental content at a time, that content-presentation device would not have to share bandwidth with the other content-presentation device. Further, the content-presentation device could have successfully downloaded all of the supplemental content before the content-modification opportunity and carried out a content-modification operation.

Disclosed herein are methods and systems to address this and potentially other issues. In an example method, a computing system can receive, from a first content-presentation device, a request for supplemental content for use in connection with performing a content-modification operation. The computing system can then identify a download conflict between the first content-presentation device and a second content-presentation device having a same IP address as the first content-presentation device. Further, the computing system can provide, to the first content-presentation device, a response to the request. Based on the identifying, the request can include a download delay instruction. Reception of the response by the first-content presentation device can cause the first content-presentation device to wait until a condition associated with the download delay instruction is satisfied before downloading a supplemental content item specified in the response.

II. Example Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
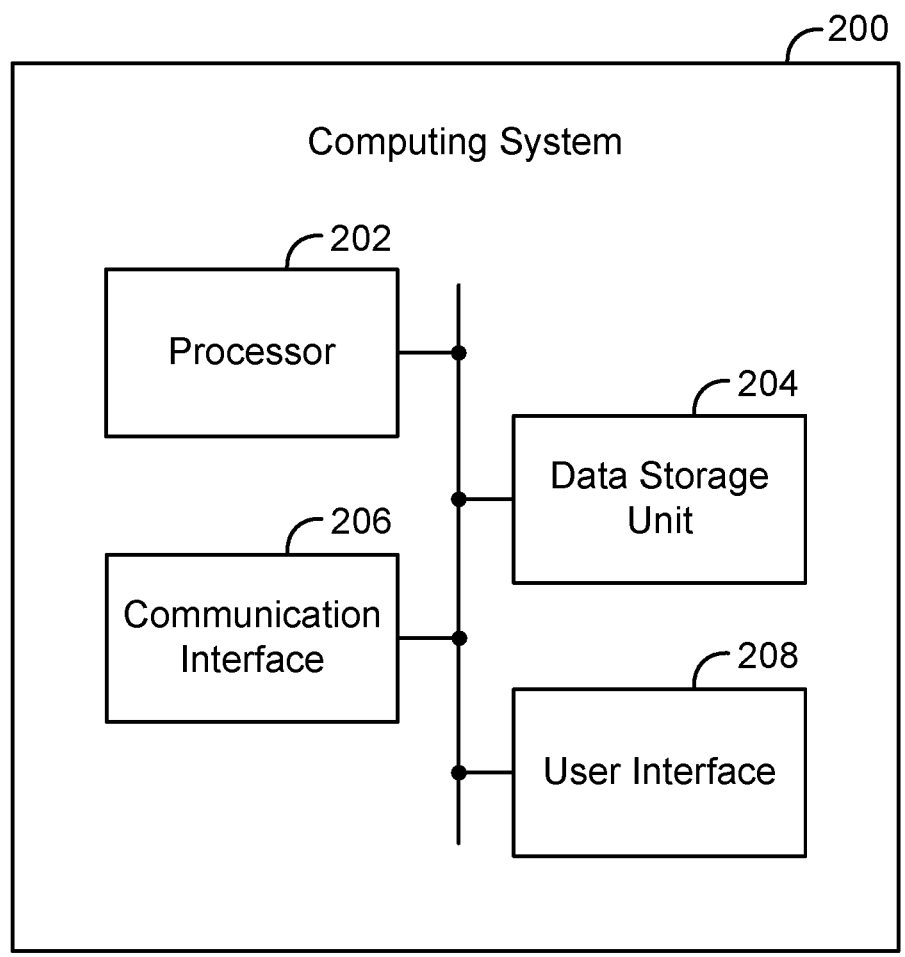
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

Figure 3:
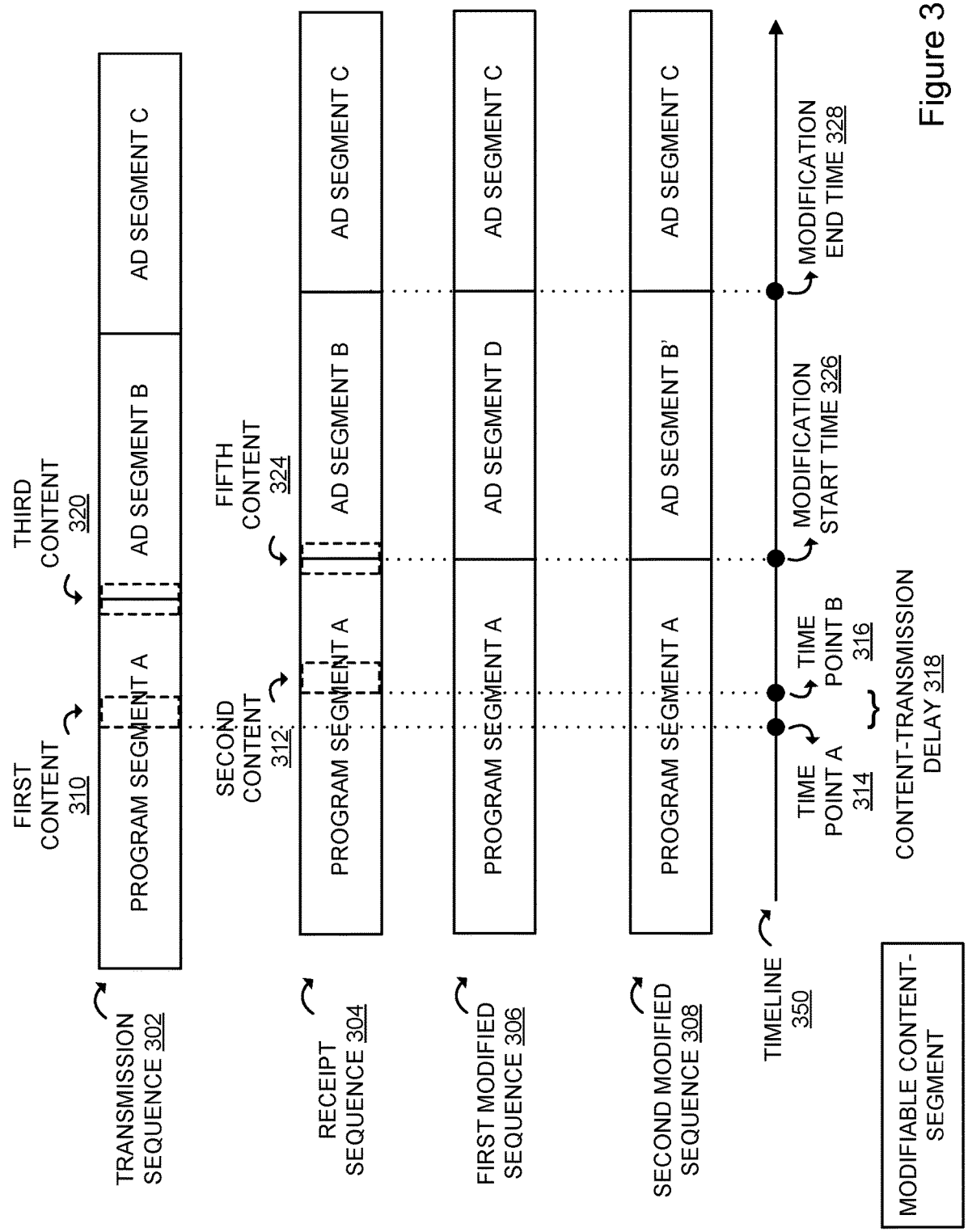
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content-presentation device 104 to overlay on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. By way of example, the content-distribution system 102 can generate the first fingerprint data by selecting multiple patches of a frame of video content and calculating a value for each of the selected multiple patches. In some instances, the values can include Haar-like features at different scales and in different locations of displayed regions of the frame of video content. Further, in some instances, the values can be derived from an integral image, which is a summed image where each pixel is a sum of values of the pixels above and to the left, as well as the current pixel. Using an integral image technique may increase the efficiency of the fingerprint data generation.

The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. By way of example, the first fingerprint data may include a first group of fingerprints, and the second fingerprint data may include a second group of fingerprints. The fingerprint-matching server 106 can determine that the first group of fingerprints match the second group of fingerprints upon determining that a similarity between each of the query fingerprints and each of the respective reference fingerprints satisfies a predetermined threshold associated with a Tanimoto distance measurement, a Manhattan distance measurement, and/or other distance measurements associated with matching images or other visual-based content.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. By way of example, responsive to determining that a fingerprint of the second fingerprint data matches multiple fingerprints of the first fingerprint data, the fingerprint-matching server 106 can (i) identify a fingerprint feature that differs as between the multiple fingerprints of the first fingerprint data and (ii) determine that a fingerprint of the second fingerprint data matches just one of the multiple fingerprints as to the identified fingerprint feature. Identifying the fingerprint feature can involve (i) referring to data that indicates a region of a frame that is channel specific to determine a region that is channel specific and (ii) identifying as the fingerprint feature a fingerprint feature corresponding with the determined region. The determined region can include a video frame edge or a region where channel identification is presented, for instance.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content-modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B with at least a portion of a different advertisement segment that is perhaps more targeted to the end-user. As another example, it can be desirable for the content-presentation device 104 to overlay on at least a portion of the AD SEGMENT B, overlay content that enhances at least a portion of the AD SEGMENT B in a way that is again perhaps more targeted to the end-user.

During a time-period T31, the content-presentation device 104 can generate fingerprint data representing the fifth content. This fingerprint data is referred to herein as "fifth fingerprint data." The content-presentation device 104 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The content-presentation device 104 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content-presentation device 104 can establish the synchronous lock using any synchronous lock technique now known or later developed. By way of example, the fingerprint-matching server 106 can transmit, to the content-presentation device 104, at least a portion of the third fingerprint data, and the content-presentation device 104 can increase the frame rate at which the content-presentation device 104 generates the fifth fingerprint data. The content-presentation device 104 can then use the third and fifth fingerprint data—namely, the time-stamps at which the third and fifth fingerprint data were generated— as a basis to establish synchronous lock (e.g., a time offset) between (i) true time defined along a timeline within the content being transmitted by the content-distribution system 102 and (ii) client time defined according to a clock of the content-presentation device 104. As another example, the fingerprint-matching server 106 can establish synchronous lock as described above and then inform the content-presentation device 104.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B with the AD SEGMENT D. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B, thereby modifying it to AD SEGMENT B'. As a result, rather than outputting for presentation the RECEIPT SEQUENCE 304, the content-presentation device can instead output for presentation the SECOND MODIFIED SEQUENCE 308.

In some examples, the content-presentation device 104 can perform an entirety of a content-modification operation (e.g., a replacement or overlay action, as described above) while tuned to the channel on which the RECEIPT SEQUENCE 304 is received, unless an intervening event occurs that might cause the content-modification operation (or the output of the resulting content) to be stopped, such as a channel change or a powering down of the content-presentation device 104 and/or associated display device. Thus, the FIRST MODIFIED SEQUENCE 306 or the SECOND MODIFIED SEQUENCE 308 can be output on the same channel on which the content-presentation device 104 is tuned—that is, the channel on which the modifiable content-segment is received and on which the content-modification opportunity was identified.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Operations Related to Household Coordination

In line with the discussion above, simultaneous downloading of supplemental content by content-presentation devices having a same IP address, such as content-presentation devices within a common household, can be problematic. In accordance with the present disclosure, the content-modification system 100 can carry out various operations to coordinate the downloading of supplemental content by content-presentation devices having a same IP address. For instance, the content-modification system can receive a request for supplemental content from a first content-presentation device, identify a download conflict between the first content-presentation device and a second content-presentation device having a same IP address as the first content-presentation device, and include a download delay instruction within a response to the request from the first content-presentation device. Reception of the request by the first content-presentation device can cause the first content-presentation device to wait until a condition associated with the download delay instruction is satisfied before downloading a supplemental content item specified in the response.

Figure 5:
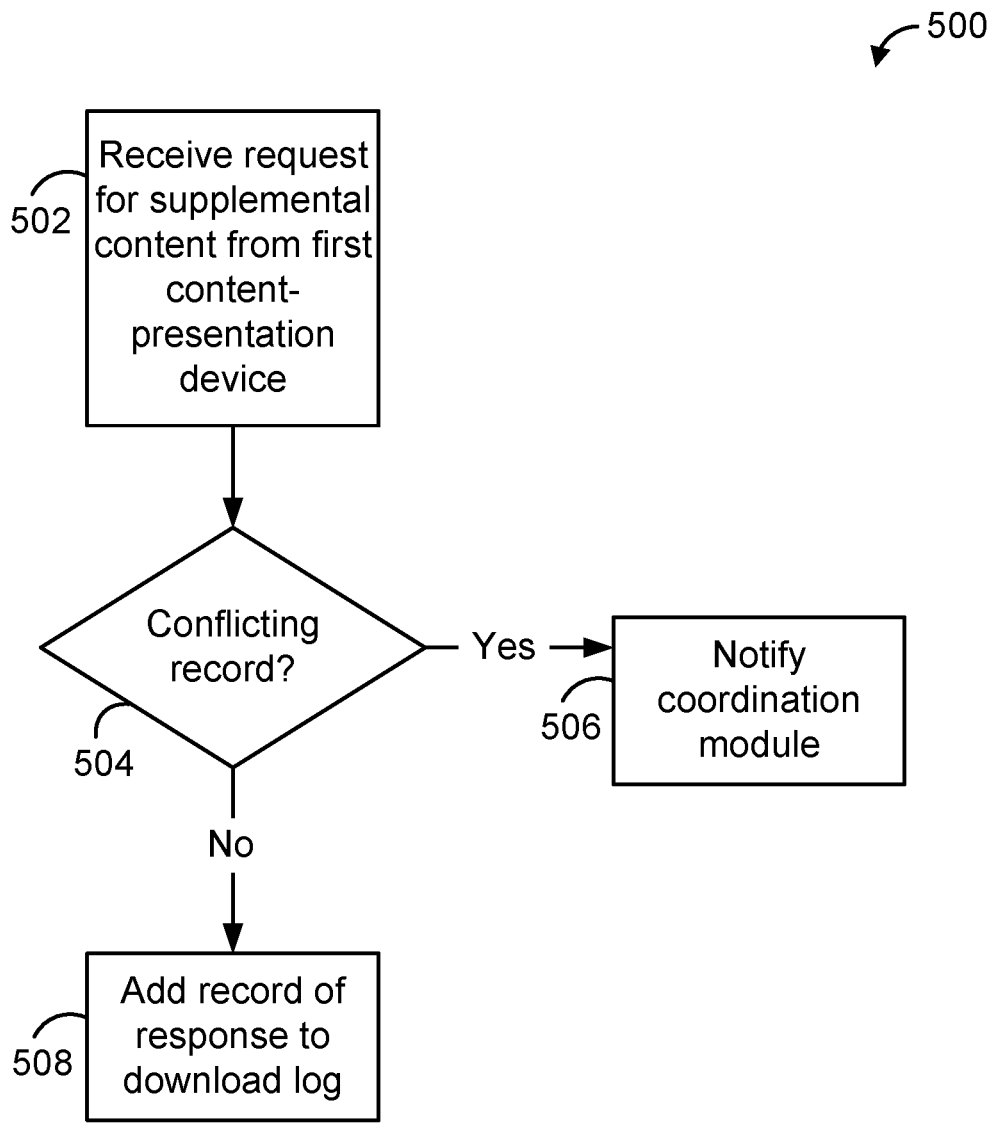
FIG. 5 shows an example process for processing a request for supplemental content.

The content-modification system can identify a download conflict in various ways. As one example, FIG. 5 shows an example process 500 for processing a request for supplemental content. As shown in FIG. 5, at block 502, the content-modification system can receive a request for supplemental content from a first content-presentation device having a given IP address. The request can be a request for supplemental content for use in connection with an identified upcoming content-modification opportunity.

Further, at block 504, the content-modification system can then determine whether another content-presentation device having the same IP address is currently scheduled to be downloading supplemental content. For instance, the content-modification system can determine whether a download log includes a record for another content-presentation device having the same IP address. The download log can indicate a time that a response was sent to the other content-presentation device along with the IP address of the other content-presentation device. Optionally, the download could log also specify an estimated download completion time for the other content-presentation device. The estimated download completion time can include a duration of time (e.g., twenty seconds) and/or a future time (e.g., a time of day) at which the other content-presentation device is anticipated to have completed downloading the supplemental content.

The content-modification system can determine the estimated download completion time based on a size of the supplemental content and an estimated download speed. The estimated download speed can be a default download speed or a download speed that is specific to the content-presentation device and derived using historic download data for the content-presentation device. If the estimated download completion time includes a future time, the content-modification system can determine the future time based further on a start time of the downloading of the supplemental content.

Still further, at block 506, based on determining that another content-presentation device having the same IP address is currently scheduled to be downloading supplemental content, the content-modification system can notify a coordination module about the potential download conflict related to the request from the first content-presentation device. For instance, based on determining that the download log includes a record for another content-presentation device having the same IP address and that the record has a timestamp that is within a threshold duration of a current time, the content-modification system can notify the coordination module. The notification can identify the second content-presentation device and the estimated download completion time. Alternatively, based on determining that the download log includes a record for another content-presentation device having the same IP address and that the estimated download completion time for the other content-presentation device is beyond a current time, the content-modification system can notify the coordination module.

The coordination module can be a component of the content-modification system. For instance, the coordination module can be part of the content-management system 108. Upon receiving the notification, the coordination module can then carry out additional operations such that the content-modification system responds to the request from the first content-presentation device in a manner that addresses the potential download conflict.

The notification provided to the coordination module can identify the first content-presentation device and the second content-presentation device. Optionally, the notification can specify the estimated download completion time and/or a download delay time. If the estimated download completion time is a time of day, the content-modification system can determine the download delay time based on a difference between a current time and the estimated download completion time. Similarly, if the estimated download completion time is a duration, the content-modification system can determine the download delay time by adding the estimated download completion time to a download start time, and comparing the current time with the result.

On the other hand, at block 508, upon determining that there is not another content-presentation device having the same IP address that is currently scheduled to be downloading supplemental content, the content-modification system can respond to the incoming request, and add a record corresponding to the response to the download log. The record can include the IP address of the first content-presentation device and a timestamp of the response. Optionally, the record can include an estimated download completion time. The content-modification system can determine the estimated download completion time based on a size of the supplemental content and an estimated download speed. The estimated download speed can be a default download speed or a download speed that is specific to the content-presentation device and derived using historic download data for the content-presentation device. If the estimated download completion time includes a future time, the content-modification system can determine the future time based further on a start time of the downloading of the supplemental content.

Figure 6:
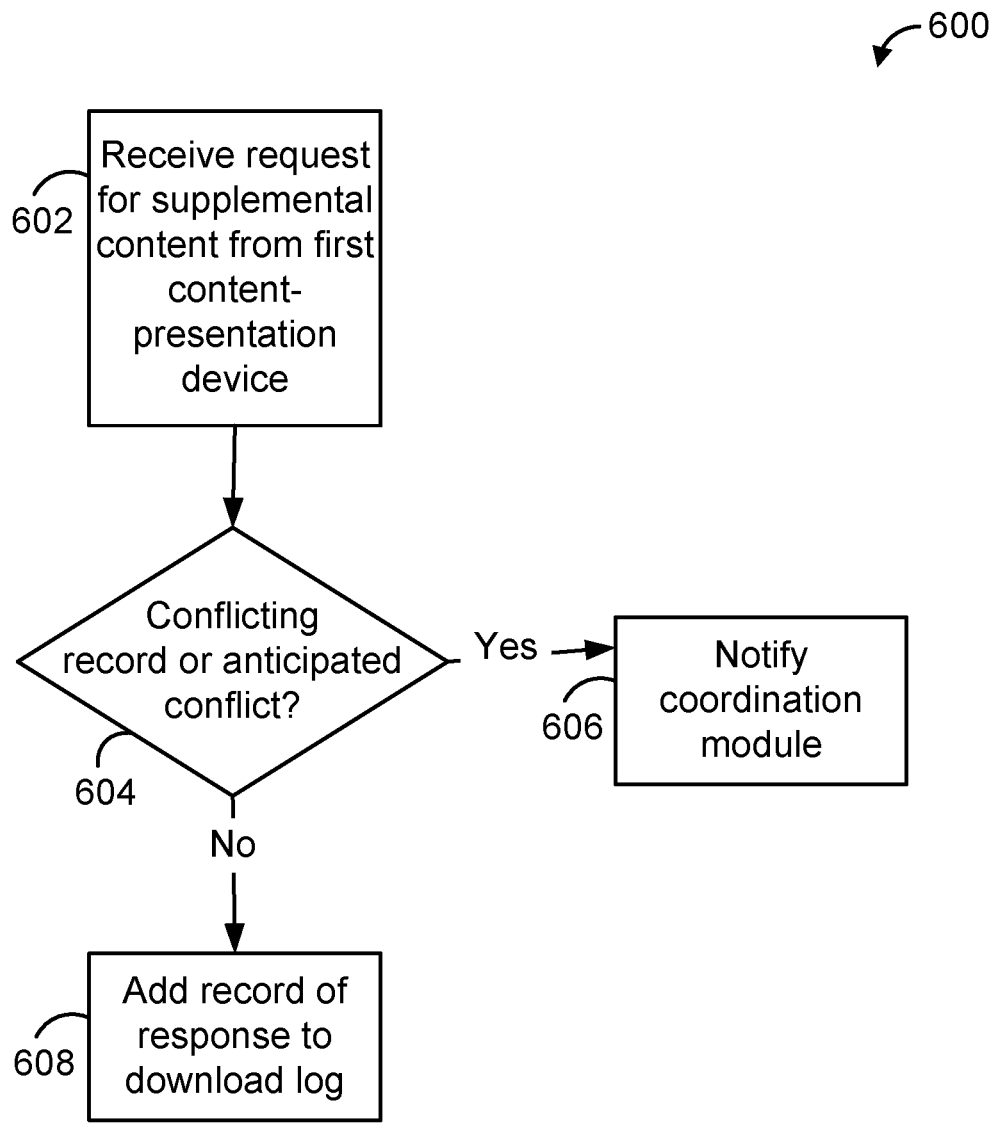
FIG. 6 shows another example process for processing a request for supplemental content.

FIG. 6 shows another example process 600 for processing a request for supplemental content. As shown in FIG. 6, at block 602, the content-modification system can receive a request for supplemental content from a first content-presentation device having a given IP address. The request can be a request for supplemental content for use in connection with an identified upcoming content-modification opportunity.

Further, at block 604, the content-modification system can then determine whether: (i) another content-presentation device having the same IP address is currently scheduled to be downloading supplemental content or (ii) a request for supplemental content is likely to be received, within a threshold period of time, from another content-presentation device having the same IP address. The threshold period of time can, for instance, be thirty seconds, forty-five seconds, one minute, or two minutes. Alternatively, the threshold period of time can be the remaining time before the content-modification opportunity.

The content-modification system can determine whether another content-presentation having the same IP address is currently scheduled to be downloading supplemental content using, for example, one or more of the operations discussed with reference to FIG. 5. The content-modification system can determine whether a request for supplemental content is likely to be received, within a threshold period of time, from another content-presentation device having the same IP address based on a channel on which content is being transmitted to the other content-presentation device. For instance, the content-modification system can determine a channel on which content is being transmitted to another content-presentation device having the same IP address, and determine whether there is an upcoming content-modification opportunity on the channel that is before the content-modification operation to which the underlying request provided at block 602 relates.

By way of example, the request received at block 602 may be a request for supplemental content for use in connection with performing a content-modification operation during an identified upcoming content-modification opportunity that is five minutes away. Further, the content-modification system may determine that a second content-presentation device having a same IP address is currently watching a given channel, and identify a content-modification opportunity on that channel that is thirty seconds away. Based on identifying that the second content-presentation device has not sent a request yet and that the content-modification opportunity for the second content-presentation device is before the content-modification opportunity for the first content-presentation device, the content-modification system can determine that a request for supplemental content is likely to be received, within the threshold period of time, from another content-presentation device having the same IP address.

In some examples, the content-management system can identify a content-modification opportunity on a given channel using a broadcast schedule. A broadcast schedule can include multiple records, each corresponding to a respective event. One common type of event is the broadcast of a content segment. A content segment can take various forms. One example content segment is a program segment, such as a television-show segment or a movie segment. Another example content segment is an advertisement segment, such as a commercial. The content-management system can determine, using broadcast-schedule data representing a broadcast schedule, that there is a scheduled advertisement break on a channel before the content-modification opportunity for the first content-presentation device, and interpret the determination to mean that there is an upcoming content-modification opportunity before the content-modification opportunity for the first content-presentation device.

As further shown in FIG. 6, at block 606, based on determining that another content-presentation device having the same IP address is currently scheduled to be downloading supplemental content or a request is likely to be received, within a threshold period of time, from another content-presentation device having the same IP address, the content-modification system can notify a coordination module about the potential download conflict related to the request from the first content-presentation device. Upon receiving the notification, the coordination module can then carry out additional operations such that the content-modification system responds to the request from the first content-presentation device in a manner that addresses the potential download conflict. The notification provided to the coordination module can identify the first content-presentation device and the second content-presentation device. Optionally, the notification can specify the estimated download completion time and/or a download delay time.

Whereas, upon determining that there is not another content-presentation device having the same IP address that is currently scheduled to be downloading supplemental content and that a request is unlikely to be received, within a threshold period of time, from another content-presentation device having the same IP address, at block 608, the content-modification system can respond to the incoming request, and add a record corresponding to the response to the download log. The record can include the IP address of the first content-presentation device and a timestamp of the response. Optionally, the record can include an estimated download completion time.

Figure 7:
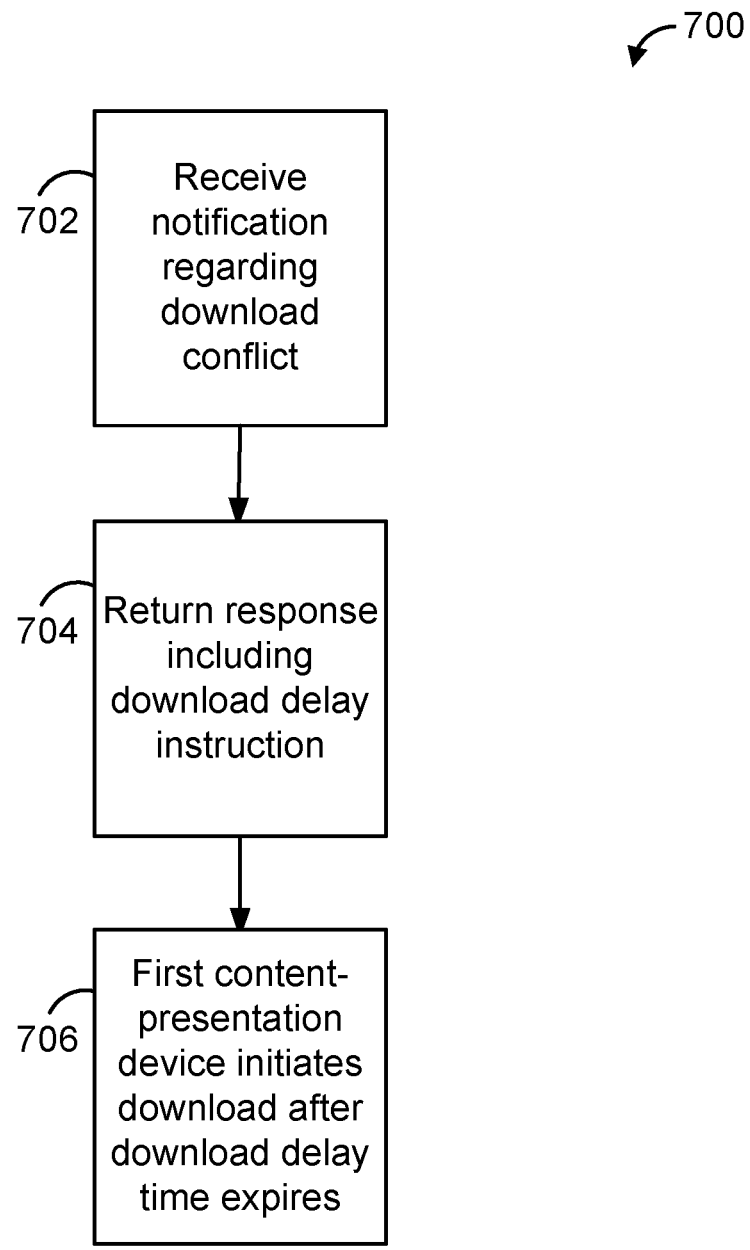
FIG. 7 shows an example process for addressing a download conflict.

The coordination module can address identified download conflicts in various ways. As one example, FIG. 7 shows an example process 700 for addressing download conflicts. As shown in FIG. 7, at block 702, the coordination module can receive a notification regarding a potential download conflict related to a request from a first content-presentation device. The notification can identify the first content-presentation device and the second content-presentation device. Optionally, the notification can specify a download delay time and/or an estimated download completion time.

Further, at block 704, based on receiving the notification, the coordination module can send a response to the first content-presentation device, with the response including a download delay instruction that causes the first content-presentation device to wait until a download delay time expires before downloading a supplemental content item specified in the response.

In examples in which the notification does not include a download delay time or estimated download completion time, the coordination module can use an identifier of the second content-presentation device (e.g., the IP address of the second content-presentation device) to access the download log, and retrieve the download delay time and/or estimated download completion time from the download log. Optionally, the coordination module can calculate the download delay time and/or estimated download completion time using the download log.

In some examples, the download delay instruction can specify a time of day at which the other content-presentation device is expected to have completed downloading supplemental content. In other examples, the download delay instruction can specify a duration of time (e.g., twenty seconds, forty seconds, etc.). The duration can correspond to an estimated remaining amount of time until the other content-presentation device has completed downloading supplemental content. Alternatively, the download delay time can be a default duration of time (e.g., fifteen seconds, thirty seconds, etc.).

As further shown in FIG. 7, at block 706, based on receiving the response, the first content-presentation device can then initiate downloading of a supplemental content item after a delay. For example, the first content-presentation device can begin downloading a supplemental content item after a time of day specified in the response or begin downloading a supplemental content item after expiration of a download delay time specified in the response.

Although the process described with reference to FIG. 7 involves including a download delay instruction in the response to the first content-presentation device, in some examples, the response provided to the first content-presentation device might not include a download delay instruction. For instance, rather than including a download delay instruction in the response, the content-modification system could forgo sending a response to the content-presentation device until after an appropriate download delay time. For instance, the coordination module can intentionally delay sending a response to the response to the request such that the response is not sent until after an estimated download completion time, expiration of a default duration of time, or expiration of a download delay time.

Figure 8:
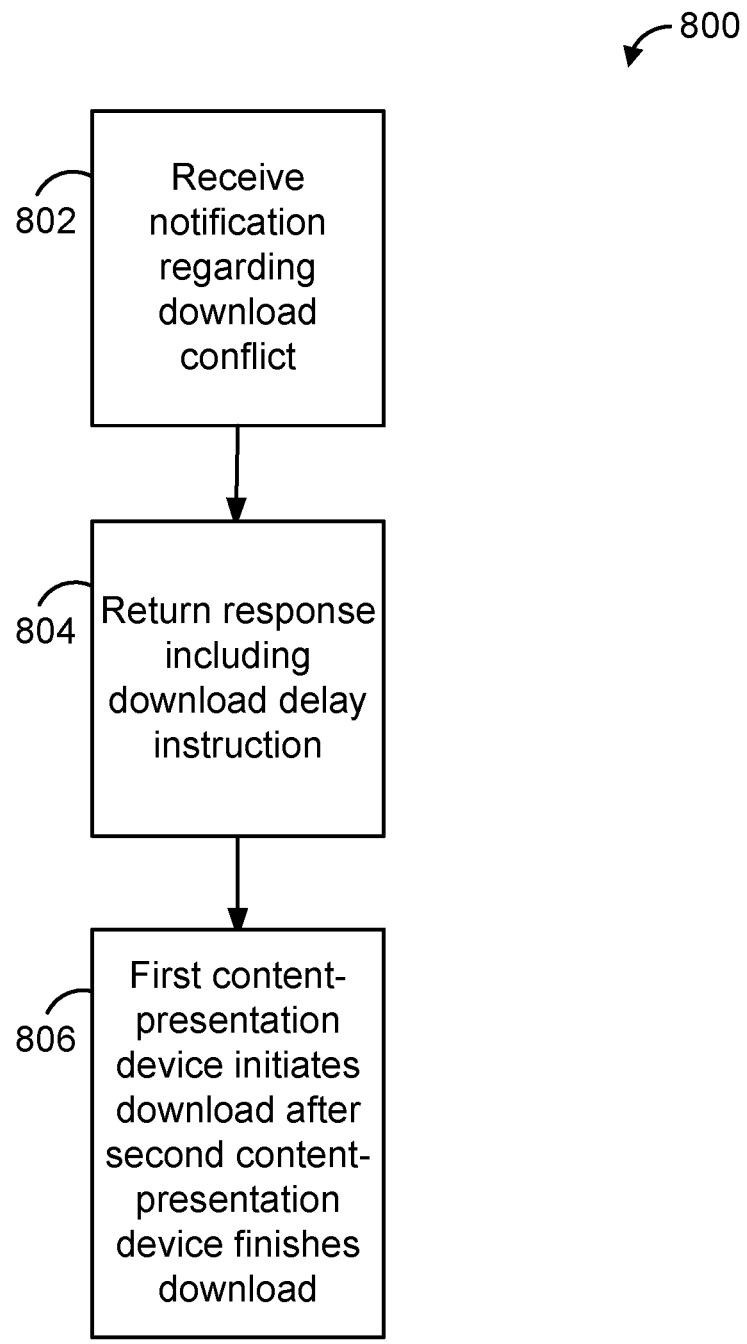
FIG. 8 shows another example process for addressing a download conflict.

FIG. 8 shows another example process 800 for addressing download conflicts. As shown in FIG. 8, at block 802, the coordination module can receive a notification regarding a potential download conflict related to a request from a first content-presentation device. The notification can identify the first content-presentation device and the second content-presentation device. Optionally, the notification can specify a download delay time and/or an estimated download completion time.

Further, at block 804, based on receiving the notification, the coordination module can send a response to the first content-presentation device, with the response including a download delay instruction that causes the first content-presentation device to wait until receiving a notification that a second content-presentation device is no longer downloading supplemental content before downloading a supplemental content item specified in the response. With this approach, after the coordination module determines that the second content-presentation device is no longer downloading supplemental content, the coordination module can notify the first content-presentation device that the second content-presentation device is no longer downloading supplemental content.

By way of example, the coordination module can send a download coordination instruction to the second content-presentation device. Reception of the download coordination instruction can cause the second content-presentation device to notify the coordination module that the second content-presentation device is no longer downloading supplemental content when the second content-presentation device is no longer downloading supplemental content. Upon completing or terminating the downloading of supplemental content, the second content-presentation device can generate and transmit a message to the coordination module. The coordination module can interpret this message to mean that the second content-presentation is no longer downloading supplemental content. And the coordination module can then notify the first content-presentation device that the second content-presentation device is no longer downloading supplemental content. Alternatively, the download coordination instruction can cause the second content-presentation device to send a notification directly to the first content-presentation device once the second content-presentation device is no longer downloading supplemental content.

As further shown in FIG. 8, at block 806, based on receiving the response, the second content-presentation device can then initiate downloading of a supplemental content after the second content-presentation device is no longer downloading supplemental content. For example, the first content-presentation device can begin downloading a supplemental content item after receiving from the coordination module or the second content-presentation device a notification that the second content-presentation device is no longer downloading supplemental content.

N. Example Method

Figure 9:
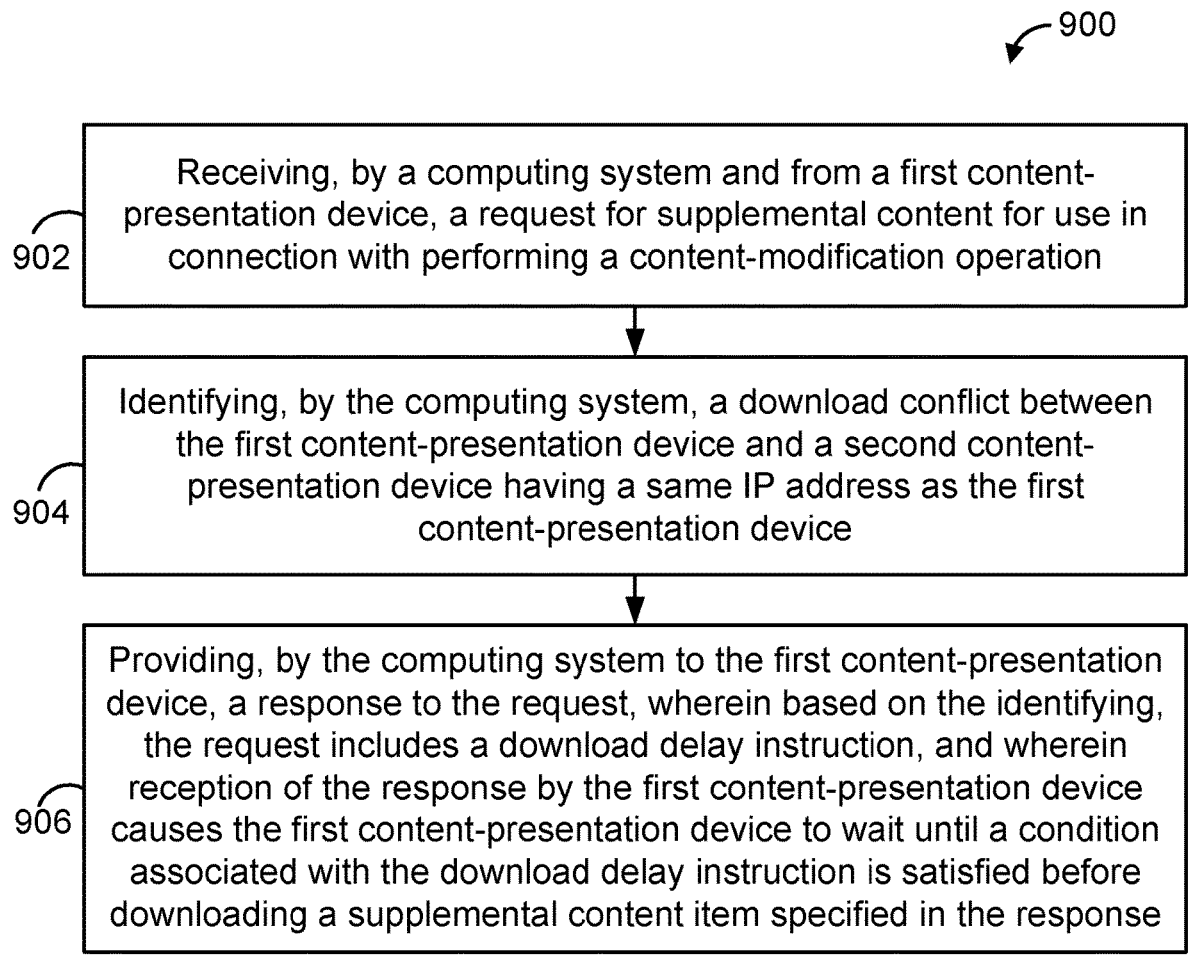
FIG. 9 is a flow chart of an example method.

FIG. 9 is a flow chart of an example method 900. Method 900 can be carried out by a content-modification system, such as the content-modification system 100, or more generally, by a computing system. At block 902, method 900 includes receiving, by a computing system and from a first content-presentation device, a request for supplemental content for use in connection with performing a content-modification operation. At block 904, method 900 includes identifying, by the first computing system, a download conflict between the first content-presentation device and a second content-presentation device having a same IP address as the first content-presentation device. And at block 906, method 900 includes providing, by the computing system to the first content-presentation device, a response to the request. Based on the identifying, the request includes a download delay instruction. Reception of the response by the first content-presentation device causes the first content-presentation device to wait until a condition associated with the download delay instruction is satisfied before downloading a supplemental content item specified in the response.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
receiving, by a computing system and from a first content-presentation device, a request for supplemental content for use in connection with performing a content replacement operation; identifying, by the computing system, a download conflict between the first content-presentation device and a second content-presentation device having a same internet protocol (IP) address as the first content-presentation device, wherein identifying the download conflict comprises: determining a channel on which content is being transmitted as a broadcast stream transmission to the second content-presentation device; and identifying an upcoming content-modification opportunity on the channel that is before the content replacement operation; and providing, by the computing system to the first content-presentation device, a response to the request, wherein based on the identifying, the request includes a download delay instruction, and wherein reception of the response by the first content-presentation device causes the first content-presentation device to wait until a condition associated with the download delay instruction is satisfied before downloading a supplemental content item specified in the response.

2. The method of claim 1, wherein identifying the download conflict comprises determining that the second content-presentation device is scheduled to currently be downloading supplemental content.

3. The method of claim 2, wherein determining that the second content-presentation device is scheduled to currently be downloading supplemental content comprises:
   determining an estimated download completion time for the second content-presentation device; and
   determining that the estimated download completion time is beyond a current time.

4. The method of claim 3, further comprising determining a download delay time based on the estimated download completion time,
   wherein the download delay instruction comprises an instruction to wait until the download delay time expires before downloading the supplemental content item.

5. The method of claim 3, wherein:
   determining the estimated download completion time comprises determining the estimated download completion time using a download log, and
   the download log specifies the estimated download completion time.

6. The method of claim 1, wherein the download delay instruction comprises an instruction to wait until receiving a notification that the second content-presentation device is no longer downloading supplemental content before downloading the supplemental content item.

7. The method of claim 6, further comprising, based on the identifying, providing to the second content-presentation device a download coordination instruction, wherein reception of the download coordination instruction by the second content-presentation device causes the second content-presentation device to notify the first content-presentation device that the second content-presentation device is no longer downloading supplemental content when the second content-presentation device is no longer downloading supplemental content.

8. A non-transitory computer-readable storage medium, having stored thereon program instructions that, upon execution by a processor, cause performance of a set of operations comprising: receiving, from a first content-presentation device, a request for supplemental content for use in connection with performing a content replacement operation; identifying a download conflict between the first content-presentation device and a second content-presentation device having a same internet protocol (IP) address as the first content-presentation device, wherein identifying the download conflict comprises: determining a channel on which content is being transmitted as a broadcast stream transmission to the second content-presentation device; and identifying an upcoming content-modification opportunity on the channel that is before the content replacement operation; and providing, to the first content-presentation device, a response to the request, wherein based on the identifying, the request includes a download delay instruction, and wherein reception of the response by the first content-presentation device causes the first content-presentation device to wait until a condition associated with the download delay instruction is satisfied before downloading a supplemental content item specified in the response.

9. The non-transitory computer-readable storage medium of claim 8, wherein identifying the download conflict comprises determining that the second content-presentation device is scheduled to currently be downloading supplemental content.

10. The non-transitory computer-readable storage medium of claim 9, wherein determining that the second content-presentation device is scheduled to currently be downloading supplemental content comprises:
    determining an estimated download completion time for the second content-presentation device; and
    determining that the estimated download completion time is beyond a current time.

11. The non-transitory computer-readable storage medium of claim 10, wherein:
    the set of operations further comprises determining a download delay time based on the estimated download completion time, and
    the download delay instruction comprises an instruction to wait until the download delay time expires before downloading the supplemental content item.

12. The non-transitory computer-readable storage medium of claim 8, wherein the download delay instruction comprises an instruction to wait until receiving a notification that the second content-presentation device is no longer downloading supplemental content before downloading the supplemental content item.

13. A computing system comprising:
    a processor; and a non-transitory computer-readable storage medium, having stored thereon program instructions that, upon execution by the processor, cause performance of a set of operations comprising: receiving, from a first content-presentation device, a request for supplemental content for use in connection with performing a content replacement operation, identifying a download conflict between the first content-presentation device and a second content-presentation device having a same internet protocol (IP) address as the first content-presentation device, wherein identifying the download conflict comprises: determining a channel on which content is being transmitted as a broadcast stream transmission to the second content-presentation device; and identifying an upcoming content-modification opportunity on the channel that is before the content replacement operation, and providing, to the first content-presentation device, a response to the request, wherein based on the identifying, the request includes a download delay instruction, and wherein reception of the response by the first content-presentation device causes the first content-presentation device to wait until a condition associated with the download delay instruction is satisfied before downloading a supplemental content item specified in the response.

14. The computing system of claim 13, wherein identifying the download conflict comprises determining that the second content-presentation device is scheduled to currently be downloading supplemental content.

15. The computing system of claim 14, wherein determining that the second content-presentation device is scheduled to currently be downloading supplemental content comprises:
   determining an estimated download completion time for the second content-presentation device; and
   determining that the estimated download completion time is beyond a current time.

16. The computing system of claim 15, wherein:
   the set of operations further comprises determining a download delay time based on the estimated download completion time, and
   the download delay instruction comprises an instruction to wait until the download delay time expires before downloading the supplemental content item.

17. The computing system of claim 13, wherein the download delay instruction comprises an instruction to wait until receiving a notification that the second content-presentation device is no longer downloading supplemental content before downloading the supplemental content item.

18. The method of claim 1, wherein identifying the upcoming content-modification opportunity on the channel that is before the content replacement operation comprises accessing a broadcast schedule.

19. The method of claim 1, wherein the upcoming content-modification opportunity is a scheduled advertisement.

* * * * *